July 11, 1939.  J. A. OBERMAIER  2,165,569
SAFETY SYSTEM
Filed Oct. 3, 1935
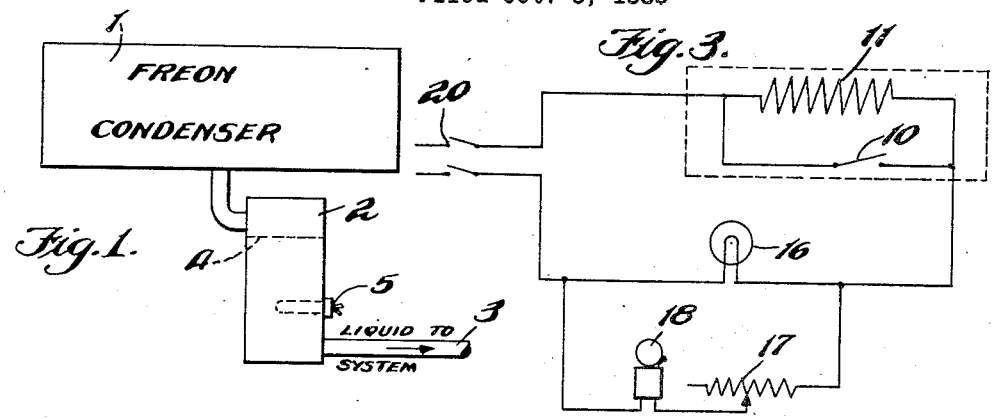
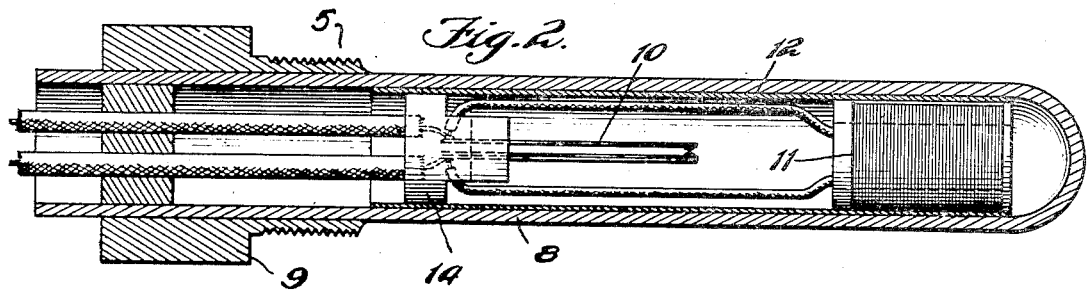
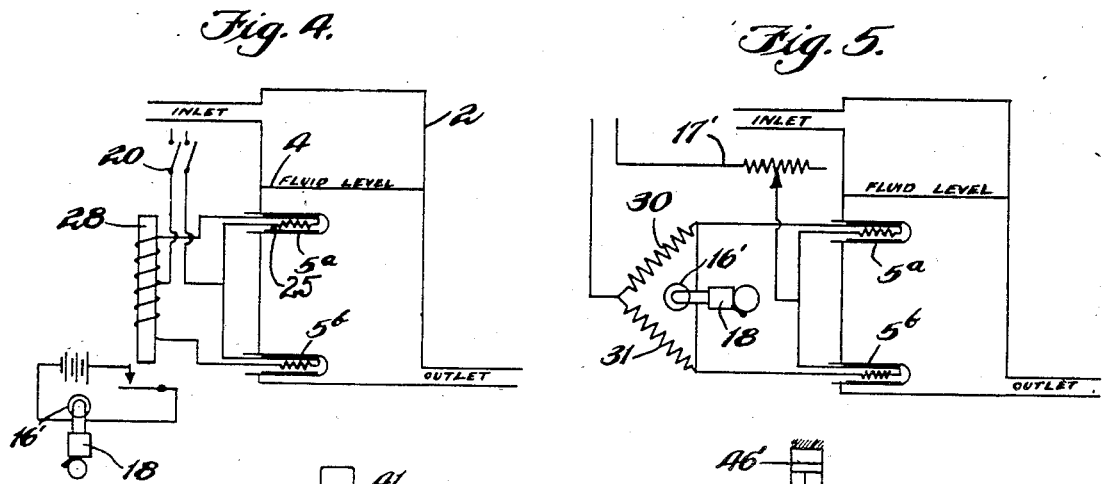
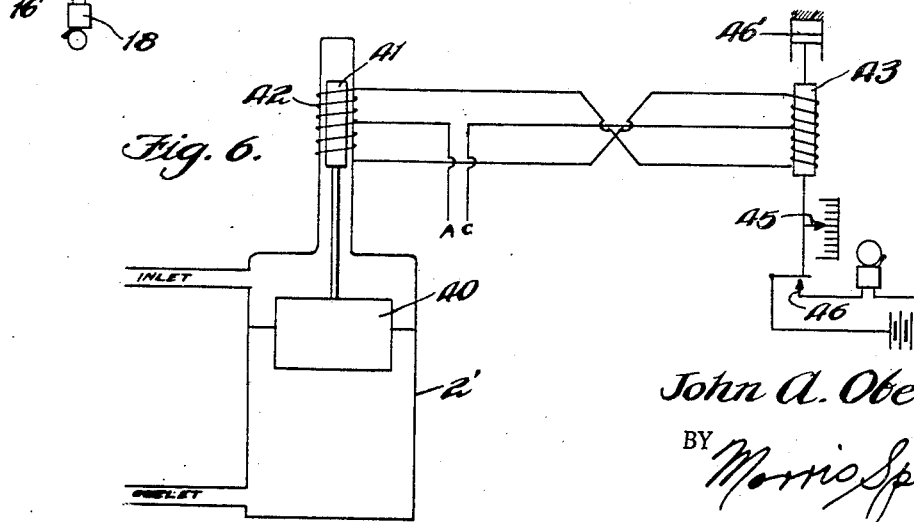
INVENTOR.
John A. Obermaier
BY Morris Spector,
ATTORNEY.

Patented July 11, 1939

2,165,569

UNITED STATES PATENT OFFICE 2,165,569

SAFETY SYSTEM

John A. Obermaier, Chicago, Ill.

Application October 3, 1935, Serial No. 43,394

7 Claims. (Cl. 62—1)

This invention relates to safety systems in general, and more particularly to such systems in combination with mechanical refrigerators for actuating an alarm to indicate a loss of refrigerant. The liquid level change detector per se, which is used in the combination of the present application, is the subject matter of my Patent No. 2,106,756, issued February 1, 1938.

Consider, by way of example, a mechanical refrigerator using dichloro-difluoro methane (C. Cl$_2$F$_2$) gas, hereafter called Freon as the refrigerant. In the event of leakage of the gas from the system it is desirable to have means for actuating an alarm when a predetermined amount of gas has been lost. This result is accomplished by providing means responsive to a drop in liquid level of the Freon, if the drop in level persists for a predetermined length of time, for actuating an alarm. It is necessary to provide the time delay because during each starting operation of the compressor the liquid level normally drops below the level at which, if prevalent during non-operating periods, the alarm should be actuated. The time lag should be about four minutes, although this may vary in different installations. The alarm is actuated only if the liquid level drop persists for more than the predetermined time lag period.

It is a further object of the present invention to provide an improved liquid level change responsive device which will be simple and reliable in its operation, which will have substantially no moving parts and thus not be subject to wear and tear, and which may be designed to have the requisite time lag in operation, and wherein the time lag is not likely to change with continued usage of the device.

It is a further object of the present invention to provide means that detects a change in liquid level by detecting differences in heat conductivity of the ambient medium.

It is a still further object of the present invention to provide a liquid level change detecting means which is electrical in operation and in which the time lag may be changed in a simple manner, as by altering the amount of external resistance in the circuit.

It is a still further object of the present invention to provide liquid level change detecting device with means for indicating, at all times, if it is in normal operative condition, so that non-operation of the device is a positive indication that the liquid level is on one side or the other of its critical position, without the uncertainty as to whether or not the non-operation is due to the faulty condition of the device.

The attainment of the above and further objects of the present invention will be apparent from the following specification taken in conjunction with the accompanying drawing forming a part thereof.

In the drawing:

Figure 1 is a diagrammatic view of a portion of a refrigerator system embodying my invention;

Figure 2 is a longitudinal sectional view of the safety bulb embodying my invention;

Figure 3 is a diagram of the electric circuit connections;

Figures 4 and 5 are diagrammatic views illustrating modifications of my invention; and Figure 6 is a diagrammatic view illustrating still another embodiment of my invention employing a standard type of float actuated liquid level indicating means.

Reference may now be had more particularly to Figure 1 of the drawing.

In this figure I have shown at 1 a condenser of any standard type of refrigerating apparatus, the refrigerant in this case being "Freon". The condensed refrigerant flows into a container 2, and thence by way of a pipe 3 to the evaporator, in a well known manner. The apparatus is of the intermittently operated type, and normally the liquid level in the container is as indicated by the dotted line 4, when the condenser is not in operation. On starting of the condenser the liquid level drops appreciably, for a short interval of time. In the normal operation of the system, when the mechanism stops, the liquid level returns to the point indicated at 4.

A safety bulb, indicated at 5, is mounted with its end projecting into the container 2, below the normal liquid level 4. Should there be a loss of refrigerant, the normal liquid level 4 will drop. If the loss is so great that the normal liquid level drops below the level of the safety bulb 5 it is desirable that an alarm be actuated to indicate such loss of refrigerant. The safety bulb of the present invention effects such a result, as will be presently set forth. During normal starting periods of the condenser the liquid level may drop below the level of the safety bulb, and remain below that level for short intervals. It is desirable that the time lag in operation of the safety bulb shall be greater than the time interval during which the liquid level remains below the level of the bulb in the normal operation of the apparatus, but that the safety bulb should function only if the drop in liquid level persists for a greater length of time, thus indicating a permanent loss of refrigerant.

Reference may now be had more particularly to Figure 2 showing the construction of the safety bulb. The safety bulb includes a tubular metal casing 8 closed at one end and having a head 9 at the open end thereof for facilitating screwing of the bulb into the container 2. Within the metal casing there is mounted a unit comprising a thermostatic switch 10 and an electric heater 11 which are enclosed in a copper tube 12 that fits snugly within the metal casing. The metal 8 is preferably iron, or steel, and of an appreciably lower heat conductivity than that of the copper tube 12, the tube 12 being selected because of its high heat conductivity. The thermostatic switch 10 is connected in parallel with the resistance heater 11, being normally open and adapted to shunt out the heater when the temperature within the tube 12 exceeds that for which the thermostat is set. The thermostatic switch is mounted on a block of insulation 14 over which the end of the tube 12 fits snugly, and the resistance heater 11, which is wound on a hollow open ended spool, also fits snugly within the copper tube, whereby the unit constitutes a simple assembly.

In Figure 3 there is shown the circuit connections for the safety bulb of Figure 2. The heater 11 and thermostatic switch 10 are connected in circuit with an indicating lamp 16 and an external resistance 17, and alarm 18, to a source of alternating or direct current at 20. During normal operation of the system, when the switch 10 is open, a small current flows through the circuit including the resistance 11, and lamp 16, that current being sufficient to cause the lamp 16 to glow with a dull red light. The current flowing through the resistance 17 and alarm 18 is insufficient to actuate the alarm. If the switch 10 is closed, the current flowing through the circuit is thereby increased, so that the lamp 16 burns brightly, thus giving a visible signal indicative of the closure of the switch 10, and the current flowing through the resistance 17 and alarm 18 is sufficient to actuate the alarm.

An explanation will now be given of the operation of the system of Figure 1. During normal operation of the condenser unit heat is being supplied to the heater 11 at a small fixed rate, say approximately 50 watts. The heat thus generated is rapidly conducted by the copper tube 12 and then conducted outwardly by the metal casing 8. The temperature within the copper tube, which is the temperature that controls the thermostatic switch 10, thus reaches a value which is determined by the rate of heat conduction from the surface of the casing 8, which in turn is controlled by the heat conductivity of the ambient medium about the metal casing. When the liquid level in the container 2 is above the safety bulb, as indicated at 4, this ambient medium is liquid Freon, which has a comparatively high heat conductivity. When the liquid level within the container 2 drops below the safety bulb, the ambient medium is Freon gas, which has a comparatively lower heat conductivity. As a result, when the liquid level is below the safety bulb, the temperature of the safety bulb must rise to a higher value in order that it may continue to dissipate the substantially fixed heat input, namely, 50 watts. The rise in temperature causes the thermostatic switch 10 to close. The mass of the metal of the bulb 8 is so correlated to the rate of heat input that it takes a predetermined period of time for the mass to rise to the temperature required for operation of the switch 10, say four or five minutes. This time interval is longer than the time during which the liquid level 4 drops below the level of the bulb in the normal starting operations of the condenser. Therefore the switch 10 will not close due to a drop in liquid level in the normal operation of the condenser, but it will close when the liquid level 4 permanently drops, as due to a loss refrigerant.

If the value of the resistance 17 is changed, the normal heat input to the heater 11 will change, thus changing the time required to heat the metal casing 8, and changing the time lag for the operation of the thermostatic switch 10. The construction is made such that in the operation of the safety bulb the switch 10, once closed, remains closed for, say, three or four minutes, whereupon there is sufficient cooling of the bulb to cause the switch 10 to open and reestablish the circuit through the heater 11 and cause reclosure of the switch 10 three or four minutes thereafter.

Reference may now be had more particularly to Figure 4 wherein I have shown a somewhat different embodiment of my invention. Insofar as the parts illustrated in Figure 4 are similar to those previously described, similar reference numerals have been used. The liquid container, forming a part of the refrigerant circuit, is indicated at 2. Within this container are mounted two safety bulbs, indicated at 5a and 5b, of identical construction. These bulbs comprise a metal casing similar to the casing 8, and have a resistance heater on the inside thereof similar to the heater 11, but do not have a thermostatic switch. A copper tube 25, corresponding to the tube 12, is also provided for conducting the heat from the resistance heater to the wall of the metal casing of the bulb. In this construction the two heater elements are of wire having a comparatively high temperature coefficient of resistance so that there is an appreciable change in resistance with a change in temperature. The bulbs 5a and 5b are connected in circuit with two windings of a differential relay 28, to a source of electricity indicated at 20. Ordinarily the resistance elements of the two safety bulbs 5a and 5b are the same, and therefore the current flowing through the upper winding of the differential relay 28 is the same as in the lower winding and no energization of the relay results. The current flowing through the heater element of the two safety bulbs results in a fixed heat input into the two bulbs, say 50 watts, which heat is dissipated through the copper tube and the outer metal casing to the medium surrounding the bulbs, namely, the liquid Freon. The temperature rise on the interior of the bulbs, therefore, is determined by the heat conductivity of the liquid Freon. If the fluid level in the container 2 drops below the bulb 5a, but not below the bulb 5b, the temperature of the bulb 5b remains as before, but the temperature of the bulb 5a rises because the heat conductivity of the surrounding medium, namely, gaseous Freon, is appreciably less than that of liquid Freon. The rate of temperature rise is determined by the mass of the metal casing 8, as was described in connection with Figure 2. When the temperature within the safety bulb 5 reaches a predetermined value, approximately the equilibrium temperature, the change in resistance of the heater in the bulb 5a is sufficient to effect an appreciable reduction in the current flowing therethrough and through the upper winding of the relay 28, so that the relay 28 operates to close its contact and establish a circuit for a visual signal 16' and the audible signal 18.

In Figure 5 I have shown the safety bulbs 5a and 5b, of a structure the same as in Figure 4, connected to constitute two arms of a Wheatstone bridge, the other two arms being indicated at 30 and 31. During normal operation of the system of Figure 5 the bridge is substantially balanced so that the current flowing through the lamp 16' and the alarm is insufficient to actuate the alarm. If desired the bridge may be adjusted to a sufficient degree of unbalance to cause the lamp 16' to glow with a dull red heat. If the resistance of the element in the hub 5a increases, as previously described, the unbalance is accentuated and sufficient current flows to actuate the alarm 18 and to cause the visible signal 16' to light up brightly. An adjustable resistance 17' may, if desired, be provided. By adjusting this resistance it is possible to change the amount of current that flows through the heaters 5a and 5b during normal operation of the system and thus effect a change in the time lag of operation of the bulb 5a. A similar resistance may also be provided in Figure 4.

In Figure 6 I have shown the use of a standard type of float actuated liquid level indicating device for effecting operation of an alarm to indicate a loss of Freon from the refrigerator unit. In this case the container is indicated at 2' and has a float 40 therein which carries an iron member 41 at its upper end. Alternating current is supplied to the upper and lower halves of an induction coil 42 that surrounds the iron mass 41 on the outside of the container 2, the container 2 being of non-magnetic material. The circuit also extends through the upper and lower windings of a differential alternating current relay 43. When the float is at its normal level the currents flowing through the two halves of the relay winding are identical, hence the relay does not operate. A drop in level of the Freon in the container 2, causing a corresponding drop of the iron mass 41, permits a greater current to flow through the upper half of the winding 42, which is in series with the lower half of the relay winding 43, thus causing the relay plunger to drop an amount approximately proportionate to the drop of the mass 41. An indicator 45 indicates the level of the mass 41. When a predetermined drop of the plunger 43 occurs, a contact is closed at 46 to establish an alarm circuit. Time delay means, in the form of a dash pot 46', delays the action of the plunger 43 for a time interval of, say, four or five minutes, to produce a time lag for the purposes previously set forth. This type of float actuated level indicator is well known in the art and does not, per se, constitute a part of the present invention. This has been shown merely to illustrate a standard type of level indicating means in combination with a refrigerating unit, as above described.

In compliance with the requirements of the patent statutes there has been shown and described a few preferred embodiments of the present invention. It is, however, understood that the invention is not limited to the precise constructions here shown, the same being merely illustrative of the invention. What I consider new and desire to secure by Letters Patent is:

1. In a refrigerating system including a receiver for liquid refrigerant and of the type wherein the liquid level in the receiver increases and decreases at different times in the normal operation of the system, means for detecting a loss of refrigerant such as results in a substantial change in the average level of the refrigerant in the receiver, said means comprising a hollow mass of material at the level where changes are to be detected, an electric resistance heater in said mass, means for electrically heating the resistance to supply heat to the mass as a substantially fixed rate, whereby the temperature rise of the mass is determined by the heat conductivity of the ambient medium, and means for detecting a temperature change in the mass resulting from a change in heat conductivity of the ambient medium as the refrigerant level changes an amount to change the character of the medium surrounding the mass, the amount of material in the mass being correlated with the rate at which heat is introduced therein by the heater and dissipated therefrom so as to produce a time lag following a change in liquid level such as results in a change in the ambient medium around the mass before the temperature change reaches a value sufficient to be detected by the temperature change detecting means, said lag being greater than the minimum time interval between variations of the liquid level in the receiver during normal operations of the system.

2. In a refrigerating system including a receiver for liquid refrigerant and of the type wherein the liquid level in the receiver increases and decreases at different times in the normal operation of the system, means for detecting a loss of refrigerant such as results in a substantial change in the average level of the refrigerant in the receiver, said means comprising a hollow mass of material at the level where changes are to be detected, an electric resistance heater in said mass, means for electrically heating the resistance to supply heat to the mass at a substantially fixed rate, whereby the temperature rise of the mass is determined by the heat conductivity of the ambient medium as the liquid level changes an amount to change the character of the medium surrounding the mass, the amount of material in the mass being correlated with the rate at which heat is introduced therein by the heater and dissipated therefrom so as to produce a time lag exceeding one minute following a change in liquid level such as results in a change in the ambient medium around the mass before the temperature change reaches a value sufficient to be detected by the temperature change detecting means, and means for changing the time lag comprising a resistance in the circuit of the heater and located outside of the mass for altering the rate of heat supply by the heater.

3. In a refrigerating system including a receiver for liquid refrigerant and of the type wherein the liquid level in the receiver increases and decreases at different times in the normal operation of the system, means for detecting a loss of refrigerant such as results in a substantial change in the average level of the refrigerant in the receiver, said means comprising a hollow mass of material mounted in a fixed position at the level where changes are to be detected, an electric resistance heater in said mass, a copper tube surrounding the heater and fitting snugly within said mass for conducting heat from the heater to said mass, said mass having a substantially lower heat conductivity than that of the tube, means for electrically heating the resistance to supply heat to the mass at a substantially fixed rate, whereby the temperature rise of the mass is determined by the heat conductivity of the ambient medium, and means for detecting a temperature change in the mass resulting from a change in heat conductivity of the ambient medium as the liquid level changes an amount to change the character of the medium surrounding the mass, the amount of material in the mass being correlated with the rate at which heat is introduced therein by the heater and dissipated therefrom so as to produce a time lag exceeding one minute following a change in liquid level such as results in a change in the ambient medium around the mass before the temperature change reaches a value sufficient to be detected by the temperature change detecting means.

4. In a refrigerating system having a liquid refrigerant, means for detecting a loss of refrigerant, said means comprising a bulb of heat conducting material exposed to the liquid refrigerant whereby a loss in refrigerant will result in a change in the ambient medium about the bulb, an electric heater in the bulb and so located therein that substantially all of the heat generated thereby travels through the wall of the bulb to the portion thereof that is exposed to the liquid refrigerant during normal operation of the system, means for supplying electrical energy to the heater at a substantially fixed rate, whereby the temperature rise of the bulb above that of the surrounding medium is determined by the heat conductivity of the surrounding medium, and means for detecting a change in temperature due to a change in conductivity of the surrounding medium, said temperature change detecting means comprising a thermostatic switch in the bulb and controlling the circuit through the heater to effect a substantial reduction in current flowing through the same responsive to the rise in temperature to lower the temperature of the bulb below that required for operation of the switch, whereby periodically repeated opening and closing of the switch results, and alarm means in the circuit and operated responsive to a change effected by operation of the switch, whereby the alarm means is actuated periodically as controlled by the switch.

5. In an intermittently operating refrigerating system having a liquid refrigerant, means for detecting a loss in refrigerent, said means comprising a hollow mass of material exposed to the liquid refrigerant, an electric heater in said mass, a thermal responsive switch in said mass, and means for supplying current to the heater of a substantially fixed amount, the current supplied being of such a value that the rate of heat generation in the mass is so correlated with the heat radiating surface of the mass that the switch is operated by the temperature change of the mass upon a change in the heat conductivity of the medium surrounding the mass upon a predetermined loss of refrigerant, and the amount of material in the mass to be heated being correlated with the rate of heat generation by the heater so as to produce a time lag in the operation of the switch upon a change in medium surrounding the mass which time lag exceeds the minimum interval between normal successive operations of the system.

6. In an intermittently operating refrigerating system having a liquid refrigerant, means for detecting a loss of refrigerant comprising a hollow mass of material exposed to the refrigerant where changes are to be detected, so that upon the occurrence of a loss of refrigerant there is a change in the extent of exposure of said mass to the refrigerant, an electric resistance heater in said mass, means for electrically heating the resistance to supply heat to the mass at a substantially fixed rate, whereby the temperature rise of the mass is determined by the heat conductivity of the ambient medium, a second mass having therein a heater similar to that in the first mass, said second mass being located outside of the range of liquid level changes, and means for detecting a relative temperature change in the two masses resulting from a relative change in heat conductivity of the ambient media around the two masses upon the occurrence of said abnormal conditions, the amount of material in the first mass being correlated with the rate at which heat is introduced therein by the heater and dissipated therefrom so as to produce a lag in the time required for equilibrium temperature conditions to be attained following a change in the ambient medium around the mass which time lag exceeds the minimum interval between normal successive operations of the system.

7. In a refrigerating system including a receiver for refrigerant and of the type wherein the liquid level in the receiver increases and decreases at different times in the normal operation of the system, means for detecting a loss in refrigerant such as results in a substantial change in the average liquid level in the receiver comprising two spaced heating elements located at different levels in the receiver, means for passing electric currents through the two elements for heating the same whereby the temperature of the elements above that of the surrounding medium is determined by the heat conductivity of the surrounding medium, and means for detecting a relative change in temperature of the two elements thereby detecting a change in average refrigerant level in the receiver.

JOHN A. OBERMAIER.